Jan. 27, 1925.

C. D. ORDWAY 1,524,204

SPOOL

Filed Jan. 28, 1924

WITNESSES
Edw. Thorpe
A. L. Kitchin

INVENTOR
C. D. Ordway
BY Munn & Co.
ATTORNEYS

Patented Jan. 27, 1925.

1,524,204

UNITED STATES PATENT OFFICE.

CHARLES D. ORDWAY, OF BURLINGTON, VERMONT, ASSIGNOR TO VERMONT SPOOL & BOBBIN CO., A COPARTNERSHIP OF BURLINGTON, VERMONT, COMPOSED OF CHAS. D. ORDWAY, CARRIE D. ORDWAY, ARTHUR A. TIFFANY, HERBERT O. TAFT, WILLIAM H. WILSON, GEORGE A. ORDWAY, AND HARRY L. WINTER, ALL OF BURLINGTON, VERMONT.

SPOOL.

Application filed January 28, 1924. Serial No. 689,110.

*To all whom it may concern:*

Be it known that I, CHARLES D. ORDWAY, a citizen of the United States, and a resident of Burlington, in the county of Chittenden and State of Vermont, have invented a new and Improved Spool, of which the following is a full, clear, and exact description.

This invention relates to improvements in spools and particularly to an improved head and fastener wherein the head is firmly locked in place while still capable of removal.

The object of the invention is to provide an improved fastening device for a spool head which will be comparatively light in weight and which will be of maximum strength.

Another object of the invention is to provide a spool in which an improved removable and fastening structure is presented capable of easy application and easy removal.

In the accompanying drawing—

Figure 1:
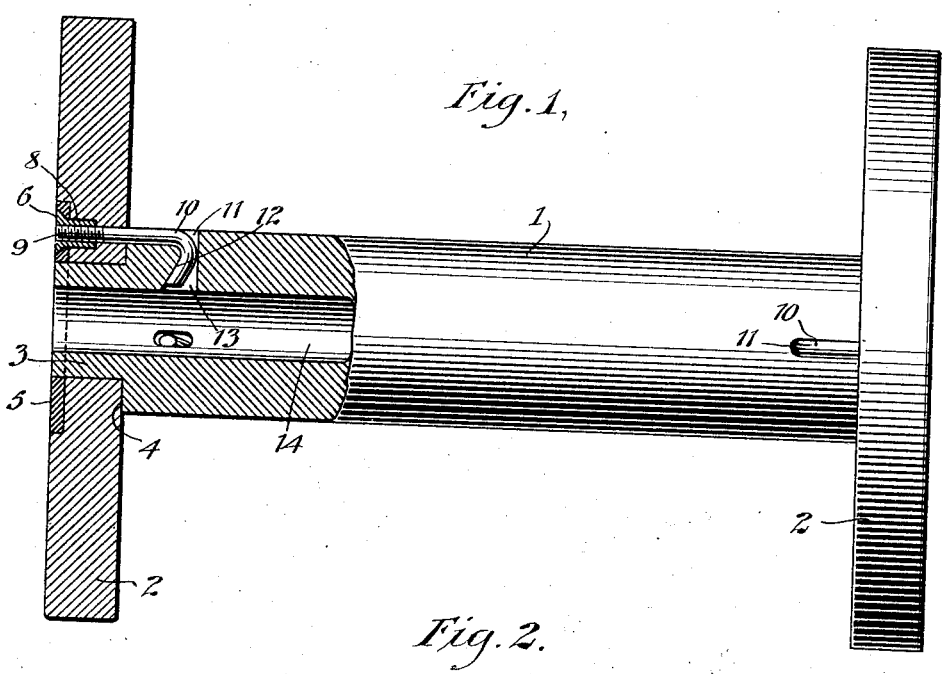
Figure 1 is a view of a spool disclosing an embodiment of the invention, the same being shown partly in vertical section.

Referring to the accompanying drawing by numerals, 1 indicates the body or barrel of the spool and 2 the respective heads. As the heads are identical and also the parts associated therewith, the description of one will apply to both. As indicated at the left in Figure 1, the barrel or body 1 is reduced at 3 for providing a restricted portion for receiving the head 2 which rests against the shoulder 4. It will be understood that the head 2 is provided with a bore of a size to snugly fit over the reduced extension 3. Countersunk in the head 2 is an annular ring 5 acting as a washer for the respective nuts 6, which nuts have slots or curves 7 for receiving suitable wrenches whereby they may be applied or removed. The heads of these nuts are beveled on the under surface preferably and countersunk in ring 5 while the bodies 8 thereof project into the head 2. These nuts are, of course, internally threaded for co-acting with a threaded end 9 of the retaining hook 10 which is fitted into a longitudinal groove 11 and arranged so that the hook end 12 will fit in the radial bore 13. This bore usually extends to the central bore 14 of the body 1 though this is not always necessary as the hook section 12 is intended to fall short of the bore 14.

Figure 2:
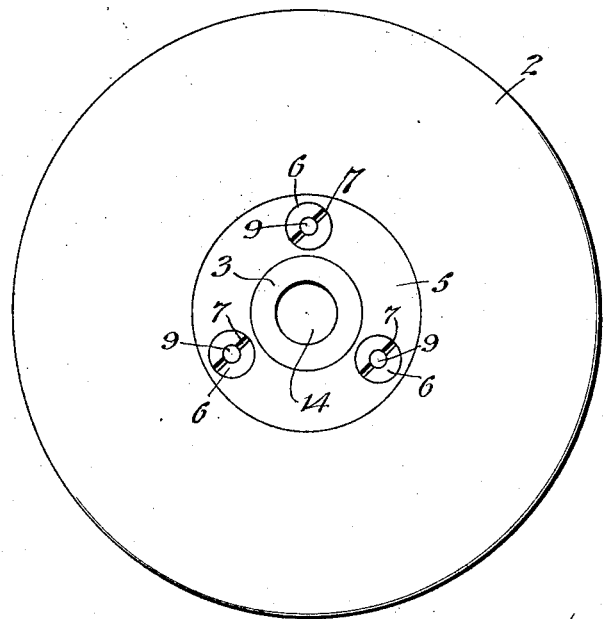
Figure 2 is an end view of the spool shown in Figure 1.

When the parts are in the position shown in Figures 1 and 2, the spool is ready for use. If it should be desired to remove the head 2 at any time, a suitable key or instrument could be used for unscrewing nut 6 whereupon the head 2 may be readily removed and replaced or a new one substituted. The ring 5 acts as a washer for the various nuts 6 and if desired, instead of having the ring 5, separate washers for these nuts could be substituted, though ordinarily the ring structure is better by reason of the fact that it acts as a stiffening and reinforcing device for equalizing the pressure on the head and the pressure of the head against the shoulder 4.

What I claim is:

1. A spool, comprising a body having a shoulder at one end, a groove in the periphery merging into a radial bore, a head fitting against said shoulder, a retaining hook member fitting in said groove with one end extending into said head and the other into said radial bore, and a nut threaded onto said retaining hook for locking said head against said shoulder.

2. A spool, comprising a body having a reduced end whereby a shoulder is provided, a head having a bore fitting said reduced end and against said shoulder, a clamping hook for holding said head in place positioned with the hook part engaging said body and the other end projecting into said head, and a nut countersunk in said head threaded onto said clamping hook for locking the head against removal.

3. A spool, comprising a body provided at each end with a reduced portion presenting a shoulder, said body being also provided with a plurality of longitudinally positioned grooves and radial apertures merging into said grooves, a head fitted on said reduced portion and engaging said shoulder, a clamping member provided with a threaded end and a hook end, said clamping members being fitted in said grooves with their hook ends in said radial apertures and their threaded ends projecting into said head, a nut threaded onto said threaded ends for clamping the head against said shoulder, and means acting as a washer for distributing the strain from said nut to said head.

4. A spool, comprising a body, a head mounted on each end of the body, a plurality of clamping members anchoring in said body and extending into said heads, a nut for each of said anchoring members countersunk in said heads, and a ring acting as washers countersunk in said heads and co-acting with said nuts for transmitting the strain from the nuts to the heads.

CHARLES D. ORDWAY.